(No Model.)
G. M. WERNTZ.
RIDING ATTACHMENT FOR HARROWS.
No. 435,619. Patented Sept. 2, 1890.
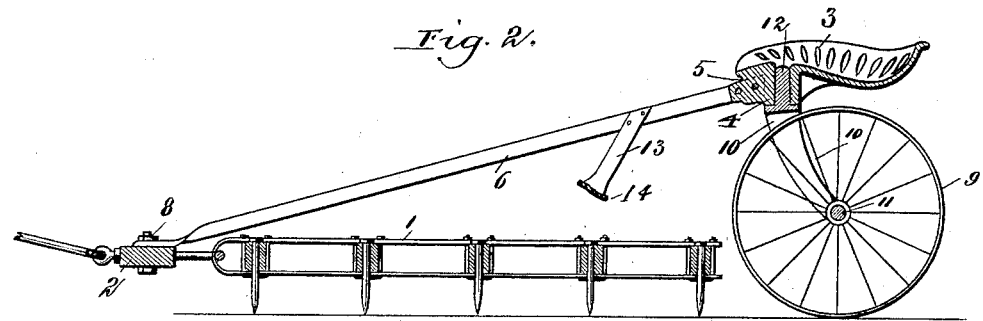
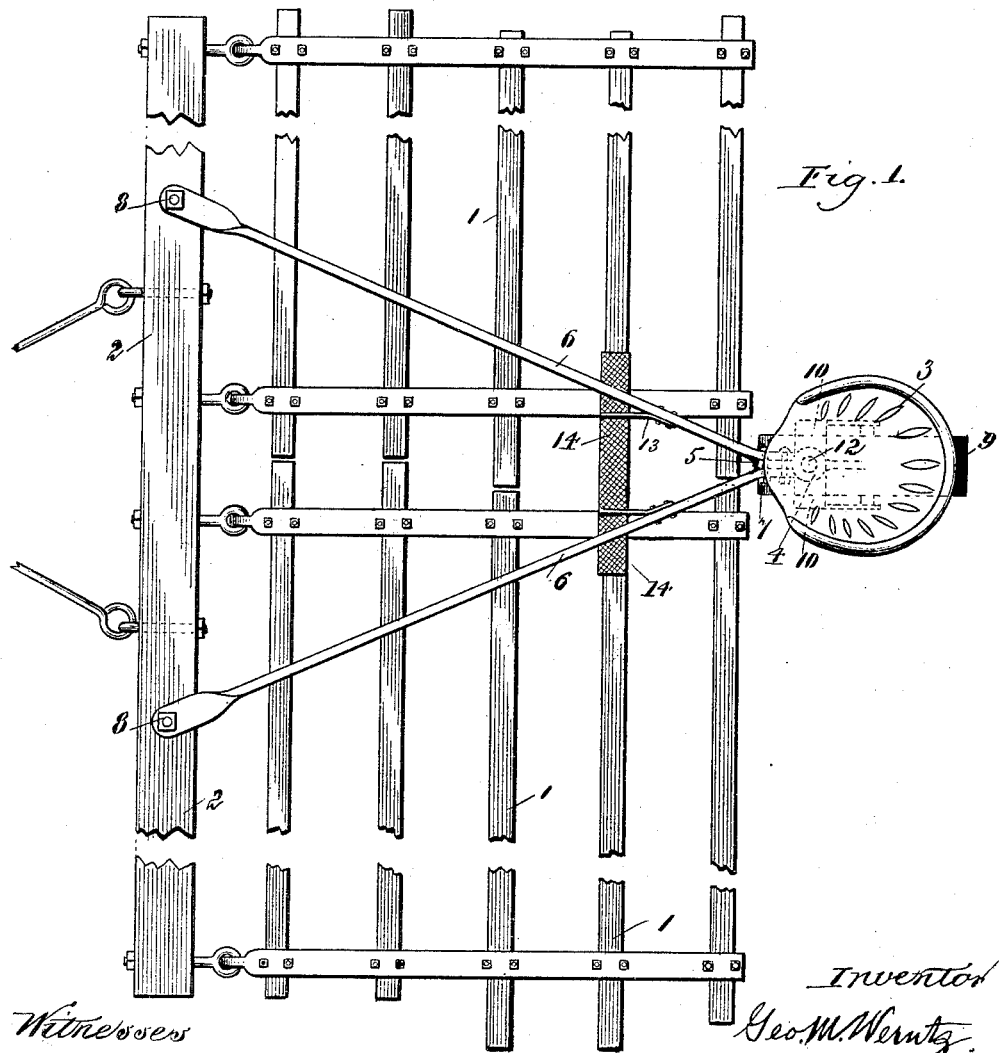

UNITED STATES PATENT OFFICE.

GEORGE M. WERNTZ, OF PERU, ILLINOIS.

RIDING ATTACHMENT FOR HARROWS.

SPECIFICATION forming part of Letters Patent No. 435,619, dated September 2, 1890.

Application filed April 29, 1890. Serial No. 349,892. (No model.)

*To all whom it may concern:*

Be it known that I, GEORGE M. WERNTZ, of Peru, in La Salle county, in the State of Illinois, have invented certain new and useful Improvements in Riding Attachments for Harrows, of which the following is a specification.

My invention relates to a single-wheel attachment for harrows; and the object of my improvement is to provide a light attachment of such construction that it may be attached to the evener of a common harrow, so as to carry the driver without materially encumbering or affecting the operation of the harrow. This object I have attained by the attachment constructed as illustrated in the accompanying drawings, in which—

Figure 1 is a top or plan view of the attachment in connection with a harrow. Fig. 2 is a side elevation of the same, the seat and swivel-socket being shown in longitudinal section.

In the drawings, reference-numeral 1 designates the harrow, and 2 the harrow-evener, both of ordinary construction.

The attachment consists of a seat 3, which is provided with a swivel-socket 4 and a forwardly-projecting tongue-piece 5, preferably cast as an integral piece of metal. The tongue-piece is provided with bolt-holes, whereby slender arms 6 may be secured to the seat by means of bolts 7 in such manner as to firmly connect the seat with the evener of the harrow by means of bolts 8, clevises, or other similar connecting means. The riding-wheel 9 is connected to the seat by a yoke 10, which is connected to the axle 11 of the wheel, on each side of the wheel. The upper end of the yoke is provided with a swivel-pin 12, which is adapted to the swivel-socket of the seat, the pin being placed over the wheel and a little in front of the axle and standing vertical, so as to cause said wheel to operate as a caster-wheel relatively to said seat. To the arms 6 are attached stirrup-bars 13, provided with stirrups or a cross-board, as 14, for a foot-rest for the driver when occupying the seat. The attachment thus constructed is both light and inexpensive. The arrangement of the seat relatively to the wheel is such that the weight of the driver is practically balanced on the wheel, the requirement of the arms being only to steady the weight of the driver on the wheel. The effect of connecting the arms to the harrow or the evener thereof is merely to steady the arms and not materially interfere with the operation of the harrow.

What I claim is—

1. In a riding attachment for harrows, and in combination, the seat provided with the swivel-socket 4 and tongue-piece 5, the arms 6, secured to the tongue-piece, the wheel 9 and the yoke 10, and the foot-rest secured to said arms, said parts being arranged, as shown, relatively to one another to produce the attachment device, substantially as shown and described.

2. In a riding attachment for harrows, and in combination, a seat provided with a swivel-socket and rigid arms for attaching the seat to the harrow or its evener, and a caster-wheel provided with a swivel-pin adapted to the swivel-socket of the seat and affording an otherwise rigid connection therewith for balancing the weight of the driver on the wheel through the connection of the arms with the seat, as specified.

GEORGE M. WERNTZ.

Witnesses:
R. HEITH,
C. M. WOODLAND.